United States Patent
Lui et al.

(10) Patent No.: US 6,727,830 B2
(45) Date of Patent: Apr. 27, 2004

(54) TIME BASED HARDWARE BUTTON FOR APPLICATION LAUNCH

(75) Inventors: Charlton E. Lui, Redmond, WA (US); Jeffrey R. Blum, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 98 days.

(21) Appl. No.: 10/195,256

(22) Filed: Jul. 12, 2002

(65) Prior Publication Data

US 2002/0180622 A1 Dec. 5, 2002

Related U.S. Application Data

(63) Continuation of application No. 09/226,031, filed on Jan. 5, 1999, now abandoned.

(51) Int. Cl.[7] .............................................. H03M 11/00
(52) U.S. Cl. ........................... 341/20; 341/22; 341/26; 345/172; 708/145; 708/146
(58) Field of Search ............................ 341/20, 22, 26, 341/34; 178/17 C; 400/479; 345/172; 708/144, 145, 146; 386/83, 120

(56) References Cited

U.S. PATENT DOCUMENTS

| | | | | |
|---|---|---|---|---|
| 4,549,279 A | * | 10/1985 | Lapeyre | ...................... 708/145 |
| 5,007,008 A | * | 4/1991 | Beers | ........................... 708/145 |
| 5,134,497 A | * | 7/1992 | Kim | ............................. 386/120 |
| 5,181,029 A | * | 1/1993 | Kim | ............................. 341/20 |
| 5,258,748 A | * | 11/1993 | Jones | .......................... 345/172 |
| 5,818,361 A | * | 10/1998 | Acevedo | ....................... 341/23 |
| 6,167,412 A | * | 12/2000 | Simons | ....................... 708/105 |
| 6,192,187 B1 | * | 2/2001 | Kinghorn | ...................... 386/83 |

OTHER PUBLICATIONS

*Applications Handbook for the Palm III™ Organizer*, 3Com Corporation, 1998.
*Handbook for the Palm III™ Organizer*, 3Com Corporation, 1998.

\* cited by examiner

Primary Examiner—Albert K. Wong
(74) Attorney, Agent, or Firm—Christensen O'Connor Johnson Kindness PLLC

(57) ABSTRACT

A method and system are provided for extending the functionality of application buttons on a limited resource computing device. Alternative application functions are launched based on the length of time an application button is pressed. A default function for an application is launched if the button is pressed for a short, i.e., normal, period of time. An alternative function of the application is launched if the button is pressed for a long, (e.g., at least one second), period of time. Still another function can be launched if the application button is pressed multiple times within a short period of time, e.g., double click.

27 Claims, 6 Drawing Sheets

TIME BASED HARDWARE BUTTON FOR APPLICATION LAUNCH

CROSS-REFERENCE TO RELATED APPLICATION

This application is a continuation of U.S. application Ser. No. 09/226,031, filed Jan. 5, 1999 now abandoned. The entire subject matter of U.S. application Ser. No. 09/226,031 is specifically incorporated herein by reference.

FIELD OF THE INVENTION

This invention relates generally to computer systems, and more particularly to increasing the functionality of application buttons on a limited resource computing device.

BACKGROUND OF THE INVENTION

Small, mobile computing devices, such as personal desktop assistants including hand-held and palm-type computers and the like, are becoming increasingly popular for use by business people and others who must travel, and thus cannot readily access information stored on their desktop computer or office network workstation. Although laptop computers are capable of running virtually all of the application programs that execute on desktop machines, laptop computers are often either too large and/or too heavy to carry around. There is thus an increased demand for substantially smaller palm-type computers that are able to run business applications of less complexity than those designed to run on a desktop computer and enable a user to quickly access all types of personal and business related data, such as addresses, telephone numbers, scheduled appointment times, etc.

One such palm-type computer is Microsoft's Palm-size PC. The Palm-size PC has a touch screen display. A stylus is used to input data into a user interface displayed on the touch screen display. The user interface is similar in appearance to a Windows user interface displayed on a desktop or laptop PC. A taskbar, used for launching application programs, is displayed at the bottom of the touch screen display. Applications are launched by using the stylus to select the desired application from a taskbar menu. Using a stylus can be cumbersome for users. Therefore, as an alternative to launching applications by using the stylus, the Palm-size PC contains a plurality of buttons (called application buttons) that are used to launch the more common applications installed on a Palm-size PC. Applications can be launched in a variety of states. In the past, the actuation of an application button caused an application to be launched in a particular state, for example a view state. The user was required to take further steps to invoke additional application functionality, such as opening a document. It is desirable to more easily launch applications in various states. The present invention is directed to increasing the functionality of application buttons so as to accomplish this result.

SUMMARY OF THE INVENTION

In accordance with the present invention, a method and apparatus for launching different application functions, based on the length of time an application button is pressed, are provided. The method and apparatus for launching the application function comprises: detecting that an application button has been pressed; determining the length of time the application button has been pressed; and launching alternative application functions based on the length of time the application button was pressed. If an application button is pressed for a short period of time, e.g., less than one second, an application function, such as displaying a view is launched. For example, if the application is a notes application, a short button press displays a list of summary information for the stored notes. If the same application button is pressed for a long period of time, e.g., at least one second, an alternative application function is launched. Using the notes example, a new note is opened for a long button press. Yet a third application function can be launched for a multi-press (e.g., double click) of an application button. Using the notes example, a new note is opened with a predefined template, for a multi-press of an application button.

In accordance with other aspects of the present invention, default application functions are provided. A user can override the default application functions.

In accordance with another aspect of the present invention, recording is started when a voice application button is pressed.

In accordance with yet another aspect of the present invention, recording is stopped when the voice application button is released.

In accordance with still another aspect of the present invention, a recording is erased if a voice application button is pressed and released within a threshold period of time.

In accordance with a further aspect of the present invention, a recording is stored if a voice application button is pressed for longer than a threshold period of time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
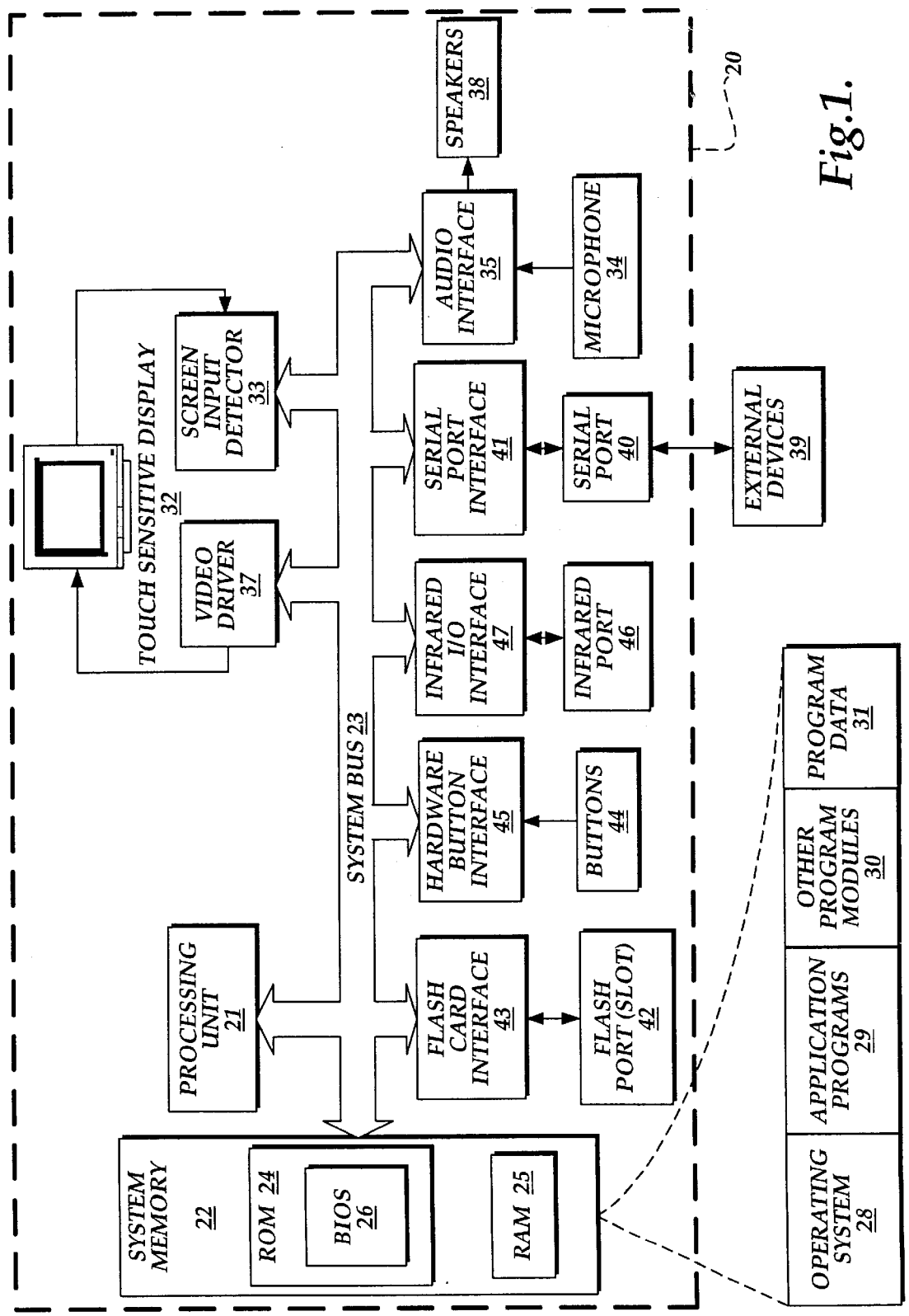
FIG. 1 is a block diagram of a palm-type computer system suitable for incorporating the present invention.

FIG. 1 and the following discussion are intended to provide a brief, general description of a suitable computing environment in which the invention may be implemented. Although not required, the invention will be described in the general context of computer-executable instructions, such as program modules, being executed by a hand-held computing device, such as a personal desktop assistant. Generally, program modules include routines, programs, objects, components, data structures and the like that perform particular tasks or implement particular abstract data types.

As those skilled in the art will appreciate from the following description, while the invention is ideally suited for incorporation in a palm-type computing device and is described in such a device, the invention can be incorporated in other limited resource devices and systems, for example mobile devices such as pagers and telephones.

With reference to FIG. 1, an exemplary system for implementing the invention includes a general purpose computing device in the form of a hand-held personal computing device 20 or the like that includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between elements within the hand-held computer 20, such as during start-up, is stored in the ROM 24.

A number of program modules are stored in the ROM 24 and/or RAM 25, including an operating system 28 (preferably Windows CE), one or more application programs 29, other program modules 30 and program data 31. A user may enter commands and information into the hand-held computer 20 through input devices such as a touch-sensitive display screen 32 with suitable input detection circuitry 33. Other input devices may include a microphone 34 connected through a suitable audio interface 35 and a physical (hardware) keyboard (not shown). The output circuitry of the touch-sensitive display 32 is also connected to the system bus 23 via a video driver 37. In addition to the display 32, the hand-held computer 20 may include other peripheral output devices, such as at least one speaker 38 and printers (not shown).

Other external input or output devices 39, such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held device 20 may further include or be capable of connecting to a flash card memory (not shown) through an appropriate connection port (e.g., slot) 42 and interface 43. A number of hardware buttons 44 such as switches, buttons (e.g., for switching applications) and the like are provided to facilitate user operation of the hand-held computing device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used.

The soft input panel architecture is primarily designed to enable character, key-based and other user data input via the touch sensitive display 32 using a stylus (not shown) of the device 20 rather than a physical keyboard (not shown). However, as will be appreciated by those skilled in the art and others, a given computer system 20 may optionally and additionally include a physical keyboard. Moreover, as will become apparent, the "soft input panel" is not limited to an actual touch-sensitive panel arranged for directly receiving input, but may alternatively or in addition respond to another input device such as the microphone 34. For example, spoken words may be received at the microphone 34, recognized, and displayed as text in an on-screen window.

Figure 2A:
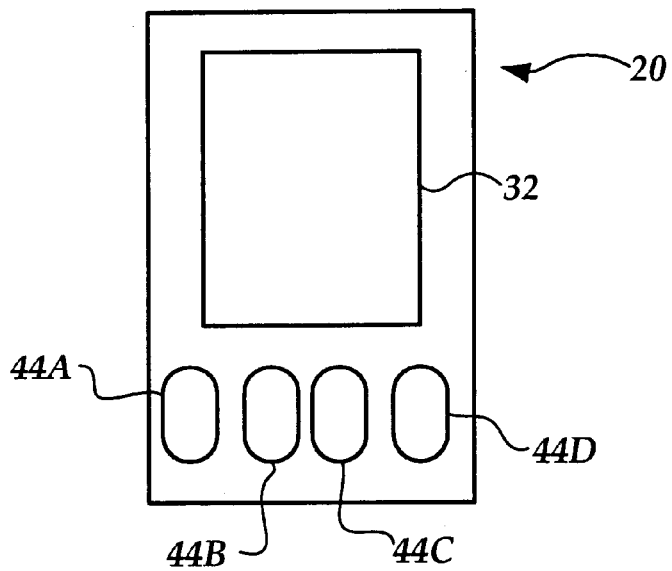
FIG. 2A is a front view of a palm-type computing device.
Figure 2B:
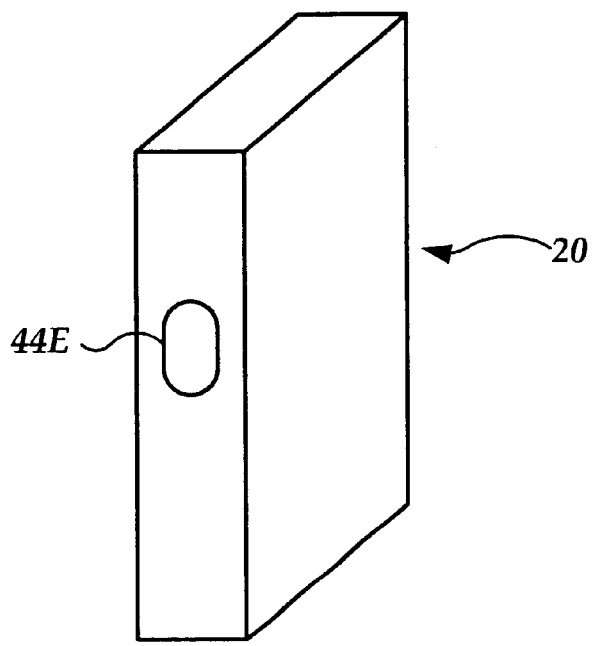
FIG. 2B is an isometric view of a palm-type computing device.

FIGS. 2A and 2B illustrate a front view and a side view, respectively, of a palm-type computing device, such as Microsoft's Palm-size PC. The palm-type computing device 20 includes a plurality of application buttons 44A, 44B, 44C, 44D and 44E. Current models of Microsoft's Palm-size PC contain from one to sixteen application buttons. The application buttons may be either voice application buttons or non-voice application buttons. A voice application button is used to record a voice note. Non-voice application buttons are mapped to commonly used applications, for example, notes, and contacts. While default mapping of application buttons is provided, the application buttons can be remapped by the user. In the past, actuating an application button simply launched an application in a certain state, e.g., the last state of the application, or the view state of the application regardless of the amount of time that the button was actuated. In contrast, the present invention launches the application in different states based on the length of time the application button is pressed. For example, a short, i.e., normal, press of the application button launches the application in the last known state, whereas a long press of the application button, e.g., at least one second, launches the application in a different state. The first state may be the last opened document and the second state may be a new document, for example.

Figure 3:
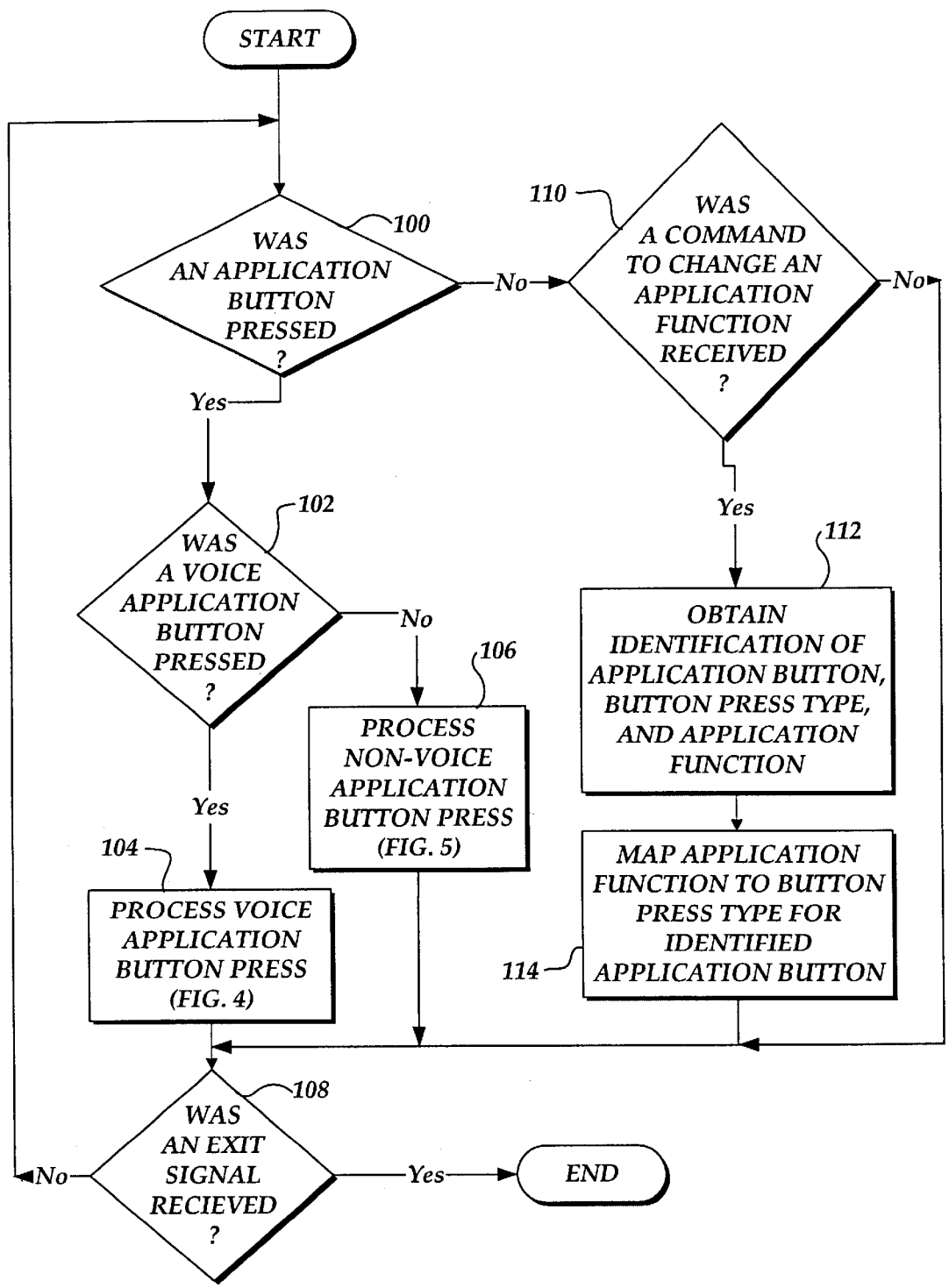
FIG. 3 is a flow diagram illustrating the overall logic used to process the pressing of application buttons in accordance with the present invention.

FIG. 3 is a flow diagram illustrating the overall logic performed in accordance with the present invention for launching alternative application functions based on the length of time an application button is pressed. The logic in FIG. 3 moves from a start block to a decision block 100 where a test is made to determine if an application button was pressed. If an application button was pressed, the appropriate application function is launched based on the application button that was pressed, and the length of time the application button was pressed. In order to determine the appropriate application function, the logic proceeds to a decision block 102 where a test is made to determine if a voice application button was pressed. If a voice application button was pressed, the logic proceeds to a block 104 where the voice application button press is processed.

Figure 4:
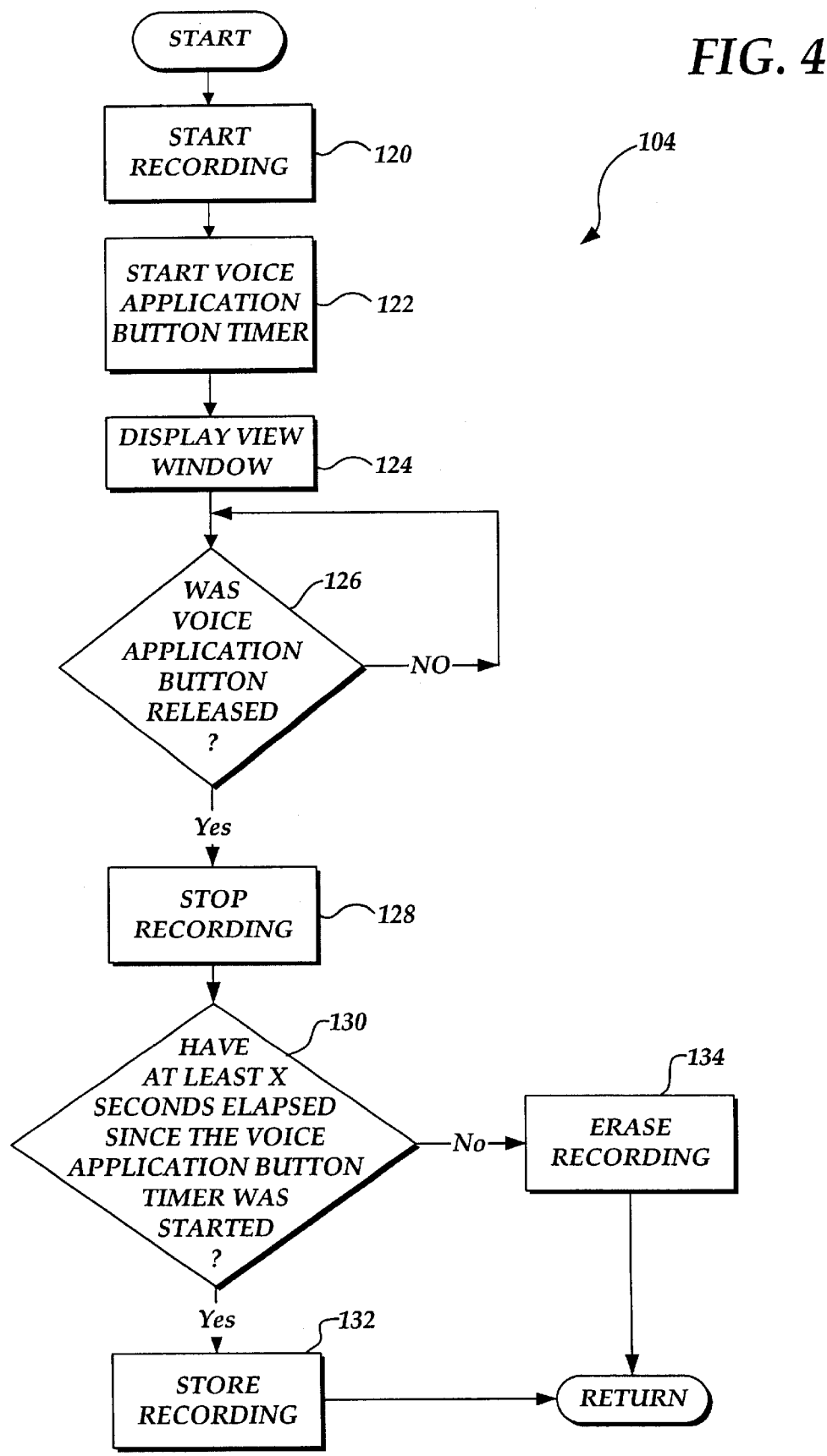
FIG. 4 is a flow diagram illustrating in detail the logic used when a voice application button is pressed.

The logic of processing a voice application button press 104 is illustrated in detail in FIG. 4. The logic in FIG. 4 moves from a start block to a block 120 where recording is started. Preferably, recording is started as soon as a voice application button is pressed. By starting recording as soon as a voice application button is pressed, no portions of the voice recording will be lost, and the user doesn't have to wait for a threshold period of time before starting to speak. The logic then moves to a block 122 where a voice application button timer is started. The logic then proceeds to a block 124 where a voice application view window is displayed. The logic then moves to a decision block 126 where a test is made to determine if the voice application button was released. If the voice application button was not released, the logic returns to decision block 126 where the test for the voice application button release is performed again until the voice application button is released. Once the voice application button is released, the logic proceeds to a block 128 where recording is stopped. The logic then proceeds to a decision block 130 where a test is made to determine if a specified number of seconds, X, have elapsed since the voice application button timer was started. In a preferred embodiment of the present invention, X is one-half second, however, it will be appreciated that different values of X can be used. If the specified period of time, X, has elapsed, a long press of the voice application button has occurred, and the logic proceeds to a block 132 where the recording is stored. If the specified period of time, X, has not elapsed, a short press of the voice application button has occurred, and the logic proceeds to a block 134 where the recording is erased.

There is no specific function for a multi-press of a voice application button in the specified embodiment illustrated in FIG. 4, therefore, a multi-press of a voice application button is equivalent to multiple button presses, i.e., recording would start when the button is pressed, and recording would stop when the button is released. The recording is erased if the voice application button was pressed and released within a threshold time, X. It will be appreciated that a multi-press of a voice application button can have specific application functionality in other embodiments of the invention. It will also be appreciated that the different application functions than the ones illustrated and described for long and short presses of a voice application can be used. For example, instead of displaying the view window whenever a voice application button is pressed (block 124), the view window can be displayed only when the voice application button is pressed and released within a threshold period of time (i.e., short button press). By only displaying the view window with a short button press, a note can be recorded and stored with a long button press, while allowing the user to continue viewing the previous display, for example, a calendar display. After the voice application function for the specified button press (e.g., long or short) has been performed (i.e., launched), the logic for processing a voice application button press ends and processing returns to FIG. 3.

Referring to FIG. 3, if in decision block 102 it is determined that a voice application button was not pressed, the logic proceeds to a block 106 where a non-voice application button press is processed. The logic of processing the non-voice application button press is illustrated in detail in FIG. 5.

Figure 5:
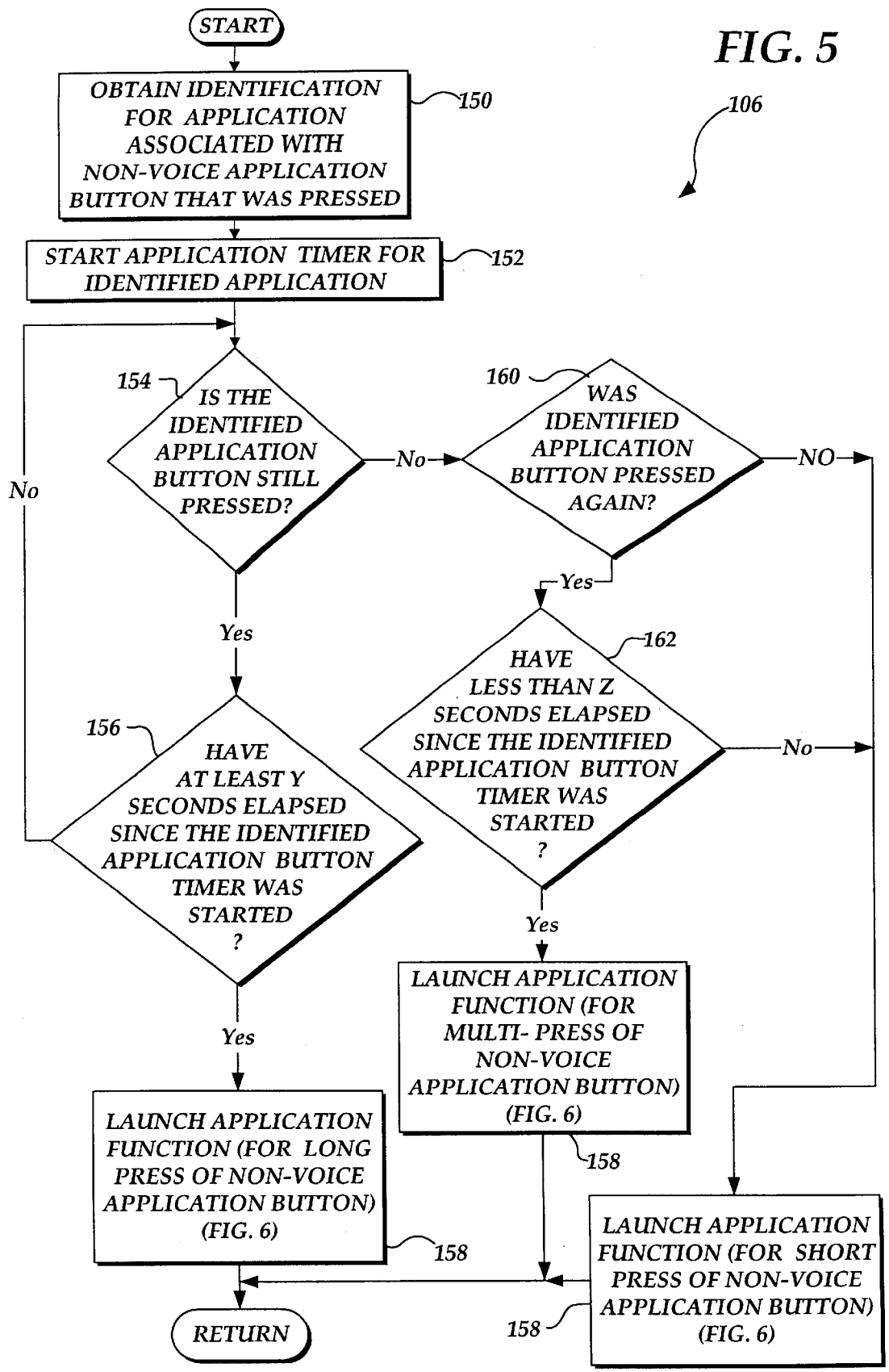
FIG. 5 is a flow diagram illustrating in detail the logic used when a non-voice application button is pressed.

The logic in FIG. 5 moves from a start block to a block 150 where an identification for the application associated with the non-voice application button that was pressed is obtained. The logic then proceeds to a block 152 where an application timer is started for the identified application. The logic then moves to a decision block 154 where a test is made to determine if the identified application button is still pressed. If the identified application button is still pressed, the logic proceeds to a decision block 156 where a test is made to determine if a specified period of time, Y, has elapsed since the identified application button timer was started. In a preferred embodiment of the invention, Y is one second, however it will be appreciated that other values for Y can be used. If the button has been pressed for at least the specified time period, Y, since the application button timer was started, the logic proceeds to a block 158 where an application function is launched for a long press of a non-voice application button. Launching an application function is illustrated in detail in FIG. 6, and is described later.

If in decision block 156 it is determined that although the identified application button is still pressed, it has not been pressed for the specified period of time, Y, the logic returns to decision block 154 until either the specified period of time, Y, has elapsed, or the identified application button is released. If in decision block 154 it is determined that the identified application button is no longer pressed, i.e., has been released, the logic proceeds to a decision block 160 where a test is made to determine if the application button has been pressed again. If the application button has been pressed again, the logic proceeds to a decision block 162 where a test is made to determine if it has been less than a specified period of time, Z, since the application button timer was started. If the application button has been pressed multiple times within the specified period of time, Z, the logic proceeds to block 158 where an application function is launched for a multi-press of a non-voice application button. The logic for launching an application function is illustrated in detail in FIG. 6, and is described later.

If the application button was not pressed again, as determined in decision block 160, or the application button was pressed again but not within the specified period of time, as determined in decision block 162, the logic proceeds to block 158 where an application function is launched for a short press of a non-voice application button. A short press is equivalent to a normal or default button press.

The logic of launching an application function is illustrated in detail in FIG. 6, and is described next. In an actual embodiment of the invention, the application associated with an application button determines the type of button press (i.e., long press, short press or multi-press). However, it will be appreciated that the operating system (28 in FIG. 1) can determine the type of button press, and forward the type of button press to the application associated with the application button that was pressed.

Figure 6:
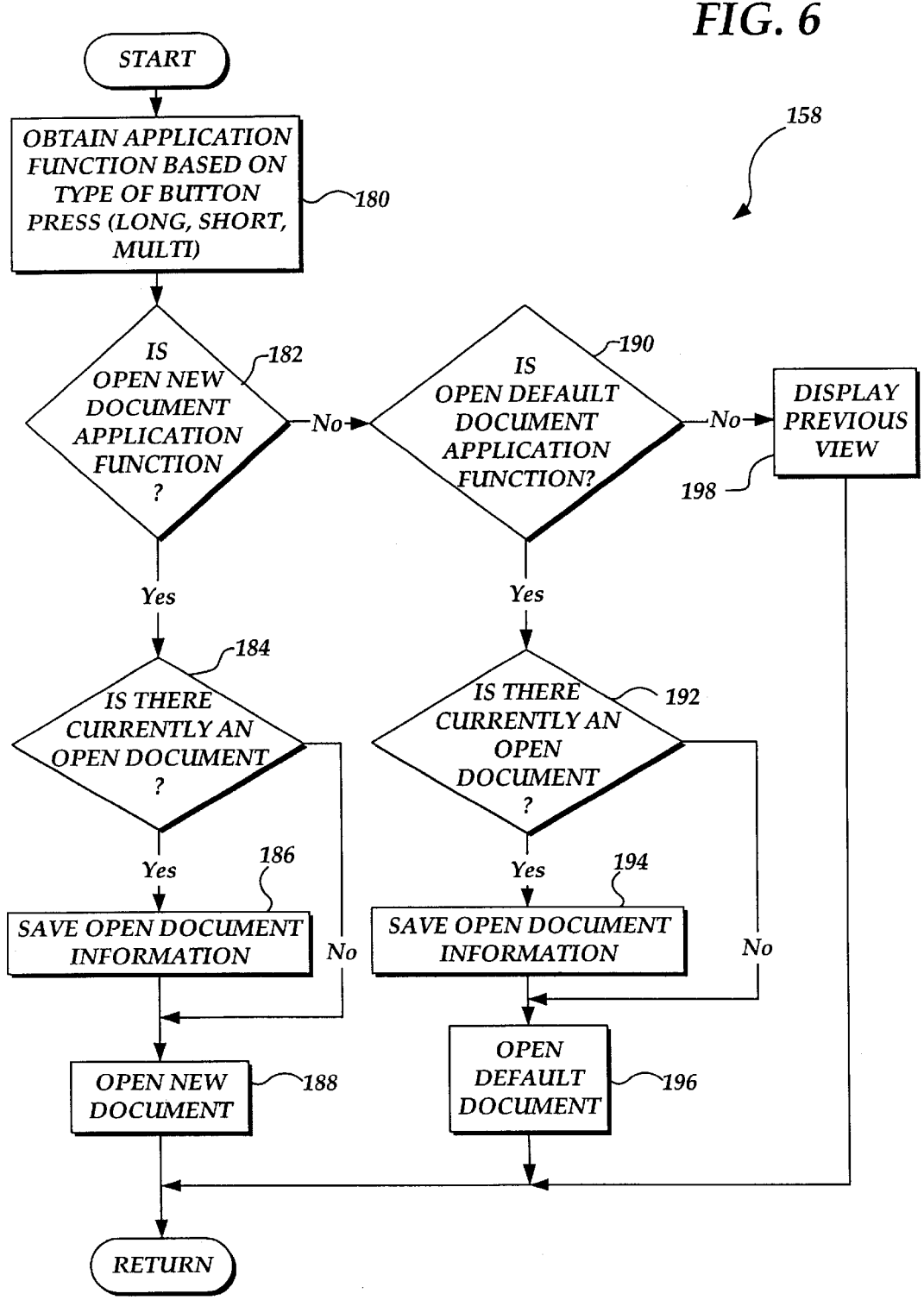
FIG. 6 is a flow diagram illustrating in detail the logic used to launch an application function based on the length of time a non-voice application button is pressed.

The logic for launching an application function based on a button press 158, whether it is a long press, short press, or multi-press, is illustrated in detail in FIG. 6. In a preferred embodiment of the present invention, default application functions are provided for the available types of button presses, however, a user can modify them via a suitable user interface. The logic of FIG. 6 moves from a start block to a block 180 where the application function is obtained based on the type (i.e., long press, short press, or multi-press) of the press of the application button. In a preferred embodiment of the invention, a short button press launches the application in the application's last known state. A long button press opens a new document. Pressing a button multiple times within a short time period, e.g., double click, launches the display of a default document, such as a template. In an alternative embodiment of the invention, the functionality associated with an application button cycles. That is, one function is launched the first time a button is pressed in a certain way (e.g., short press), and a different function is launched the next time the application button is pressed in the same way, etc. In yet another embodiment of the invention, button functionality cycles, however, cycling only occurs if successive button presses occur within a specified period of time, and/or without intervening switches to other applications. After the application function has been obtained the appropriate application function is launched. The logic of FIG. 6 illustrates the launching of exemplary application functions in a preferred embodiment. It will be appreciated that other application functions can be launched based on the pressing of an application button.

After the application function to be launched has been obtained 180, the logic proceeds to a decision block 182 where a test is made to determine if the identified application function is to open a new document. If the identified application function is to open a new document, the logic proceeds to a decision block 184 where a test is made to determine if there is currently an open document. If there is currently an open document, the logic proceeds to a block 186 where the open document information is saved. The document information is saved so that when the user closes the new document, he or she is returned to the previously opened document. Regardless of whether a current document is opened, the logic proceeds to a block 188 where a new document is opened. If in decision block 182 it is determined that the identified function is not to open a new document, the logic proceeds to a decision block 190 where a test is made to determine if the identified function is to open a default document such as a template. If the identified function is to open a default document, the logic proceeds to a decision block 192 where a test is made to determine if there is currently an open document. If there is currently an open document, the logic proceeds to a block 194 where the open document information is saved. Regardless of whether there is currently an open document, the logic proceeds to a block 196 where a default document is opened. If in decision block 190 it is determined that the identified function is not to open a default document, the logic proceeds to a block 198 where the previous view (i.e., last known state for the application, for example, a summary display) is displayed. After launching the appropriate function (e.g., opening a new document, opening a default document or displaying the previous view), the logic of FIG. 6 of launching a non-voice application function ends.

Returning to FIG. 5, after the appropriate application function has been launched based on the length of time the button was pressed, the logic then ends and processing returns to FIG. 3.

Referring to FIG. 3, if it is determined in decision block 100 that an application button was not pressed, the logic proceeds to a decision block 110 where a test is made to determine if a command to change an application function was received. Preferably, default mappings of application functions will be provided for the available button press types, and the user will be able to override the default mappings. If a command to change an application function was received, the information required to change the application function must be obtained. The information required to change the application function, i.e., an identification of an application button, a button press type, and an application function to map to the identified application for the button press type, are obtained, in a block 112. Preferably, a user interface suitable for obtaining the required information is provided. The logic then moves to a block 114 where the application function obtained is mapped to the button press type for the identified application button.

Regardless of whether an application button press has been received (yes in decision block 100) and processed, a command to change an application function has been received (yes in decision block 110) and processed, or if neither of the aforementioned has occurred, the logic next moves to a decision block 108 where a test is made to determine if an exit signal has been received. If an exit signal has not been received, the logic returns to decision block 100. The logic of processing an application button press, or processing a command to change an application function, is repeated until it is determined in decision block 108 that an exit signal has been received. When an exit signal has been received, the logic of launching alternative application functions based on the length of time an application button is pressed, ends.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for expanding the functionality of an application button on a limited resource computing device, comprising:

(a) detecting that an application button associated with a limited resource computing device application has been pressed;

(b) determining the length of time the application button has been pressed;

(c) opening an application if the application button is released prior to the expiration of a threshold time limit; and (d) opening the application and automatically causing the application to display the last known state of the application if the application button is pressed, without being released, for a period equal to or in excess of the threshold time limit.

2. A method for expanding the functionality of an application button on a limited resource computing device, comprising:

(a) detecting that an application button associated with a limited resource computing device application has been pressed;

(b) determining the length of time the application button has been pressed;

(c) opening an application if the application button is released prior to the expiration of a threshold time limit; and (d) opening the application and automatically causing the application to open a new document, if the application button is pressed, without being released, for a period equal to or in excess of the threshold time limit.

3. The method of claim 2, further comprising, prior to opening the new document:

(a) determining if a document is currently open; and (b) if a document is currently open, saving the open document.

4. A method for expanding the functionality of an application button on a limited resource computing device, comprising:

(a) detecting that an application button associated with a limited resource computing device application has been pressed;

(b) determining the length of time the application button has been pressed;

(c) opening an application if the application button is released prior to the expiration of a threshold time limit; and (d) opening the application and automatically causing the application to open a predefined document if the application button is pressed, without being released, for a period equal to or in excess of the threshold time limit.

5. The method of claim 4, further comprising, prior to opening the predefined document:

(a) determining if a document is currently open; and (b) if a document is currently open, saving the open document.

6. A method for expanding the functionality of an application button on a limited resource computing device, comprising:

(a) detecting that an application button associated with a limited resource computing device note application has been pressed;

(b) determining the length of time the application button has been pressed;

(c) opening the note application if the application button is released prior to the expiration of a threshold time limit; and (d) opening the note application and automatically causing the note application to display a list of summary information for stored notes if the application button is pressed, without being released, for a period equal to or in excess of the threshold time limit.

7. A method for expanding the functionality of an application button on a limited resource computing device, comprising:

(a) detecting that an application button associated with a limited resource computing device note application has been pressed;

(b) determining the length of time the application button has been pressed;

(c) opening the note application if the application button is released prior to the expiration of a threshold time limit; and (d) opening the note application and automatically causing the note application to open a new note if the application button is pressed, without being released, for a period equal to or in excess of the threshold time limit.

8. The method of claim 7, wherein the new note is opened using a predefined template.

9. A method for expanding the functionality of an application button on a limited resource computing device, comprising:

(a) detecting that an application button associated with a limited resource computing device application has been pressed;

(b) determining the length of time the application button has been pressed;

(c) opening the application if the application button is released prior to the expiration of a threshold time limit; and (d) opening the application and automatically causing the application to perform a predefined action specified by the user if the application button is pressed, without being released, for a period equal to or in excess of the threshold time limit.

10. A method for expanding the functionality of an application button on a limited resource computing device, comprising:

(a) detecting that an application button associated with a limited resource computing device application has been pressed;

(b) determining the length of time the application button has been pressed;

(c) opening an application if the application button is released prior to the expiration of a threshold time limit;

(d) opening the application and automatically causing a first further action associated with the application to occur if the application button is pressed, without being released, for a period equal to or in excess of the threshold time limit; and (e) opening the application and automatically causing a second further action associated with the application to occur if the application button is pressed and released more than one time within a second threshold time limit.

11. A method for expanding the functionality of an application button on a limited resource computing device, comprising:

(a) upon detecting that an application button associated with a limited resource computing device voice application has been pressed, starting a recording;

(b) determining the length of time the application button was pressed;

(c) erasing the recording if the application button is released prior to the expiration of a threshold time limit; and (d) storing the recording if the application button is pressed, without being released, for a period equal to or in excess of the threshold time limit.

12. The method of claim 11, further comprising, upon detecting that the application button associated with the limited resource computing device voice application has been released, stopping the recording.

13. A method for expanding the functionality of an application button on a limited resource computing device, comprising:

(a) detecting that an application button associated with a limited resource computing device application has been pressed a first time;

(b) determining the length of time the application button has been pressed said first time;

(c) opening an application if the application button pressed a first time is released prior to the expiration of a first threshold time limit;

(d) detecting that the same application button has been pressed a second time;

(e) determining the length of time the same application button has been pressed said second time; and (f) opening the application and automatically causing a further action associated with the application to occur if the application button pressed a second time is released prior to the expiration of a second threshold time limit.

14. The method of claim 13, wherein the first and second threshold time limits are the same.

15. The method of claim 13, further comprising alternately opening the application and opening the application and automatically causing a further action associated with the application to occur if the same application button is sequentially pressed and released prior to the expiration of the first threshold limit.

16. The method of claim 15, further comprising alternately opening the application and opening the application and automatically causing a further action associated with the application to occur if, within a third threshold time limit, the same application button is sequentially pressed and released prior to the expiration of the first threshold time limit.

17. The method of claim 16, further comprising alternately opening the application and opening the application and automatically causing a further action associated with the application to occur if the same application button is sequentially pressed and released prior to the expiration of the first threshold time limit and another intervening application button was not pressed.

18. A method for expanding the functionality of an application button on a limited resource computing device, comprising:

(a) detecting that an application button associated with a limited resource computing device application has been pressed a first time;

(b) determining the length of time the application button has been pressed said first time;

(c) opening an application if the application button is pressed a first time, without being released, for a period equal to or in excess of a threshold time limit;

(d) detecting that the same application button has been pressed a second time;

(e) determining the length of time the same application button has been pressed said second time; and (f) opening the application and automatically causing a further action associated with the application to occur if the application button is pressed a second time, without being released, for a period equal to, or in excess of, a second threshold time limit.

19. The method of claim 18, wherein the first and second threshold time limits are the same.

20. The method of claim 18, further comprising alternately opening the application and opening the application and automatically causing a further action associated with the application to occur if the same application button is sequentially pressed, without being released, for a period equal to or in excess of the first threshold time limit.

21. The method of claim 20, further comprising alternately opening the application and opening the application and automatically causing a further action associated with the application to occur if, within a third threshold time limit, the same application button is sequentially pressed, without being released, for a period equal to or in excess of the first threshold time limit.

22. The method of claim 20, further comprising alternately opening the application and opening the application and automatically causing a further action associated with the application to occur if the same application button is sequentially pressed, without being released, for a period equal to or in excess of the first threshold time limit, and another intervening application button was not pressed.

23. A method for expanding the functionality of an application button on a limited resource computing device, comprising:

(a) detecting that an application button associated with a limited resource computing device application has been pressed a first time;

(b) determining the length of time the application button has been pressed said first time;

(c) opening the application if the application button pressed a first time is pressed and released more than one time within a first threshold time limit;

(d) detecting that the same application button has been pressed a second time;

(e) determining the length of time the same application button has been pressed said second time; and (f) opening the application and automatically causing a further action associated with the application to occur if the application button pressed said second time is pressed and released more than one time within second threshold time limit.

24. The method of claim 23, wherein the first and second threshold time limits are the same.

25. The method of claim 23, further comprising alternately opening the application and opening the application and automatically causing a further action associated with the application to occur if the same application button is subsequently pressed and released more than one time within the first threshold time limit.

26. The method of claim 25, further comprising alternately opening the application and opening the application and automatically causing a further action associated with the application to occur if the same application button is sequentially pressed and released more than one time within the first threshold time limit and another intervening application button was not pressed.

27. An apparatus for expanding the functionality of an application button on a limited resource computing device, comprising:

(a) a processing unit;

(b) an application button associated with a limited resource computing device application; and (c) a storage medium coupled to the processing unit, the storage medium storing program code implemented by the processing unit for performing the methods of any one of claims 1, 2, 4, 6, 7, 9, 11, 13, 18, and 23.

* * * * *

UNITED STATES PATENT AND TRADEMARK OFFICE
CERTIFICATE OF CORRECTION

PATENT NO. : 6,727,830 B2
DATED : April 27, 2004
INVENTOR(S) : C.E. Lui et al.

It is certified that error appears in the above-identified patent and that said Letters Patent is hereby corrected as shown below:

Column 1,
Line 8, "1999 now" should read -- 1999, now --

Column 2,
Line 3, "view is" should read -- view, is --

Column 4,
Line 66, "second, however," should read -- second; however, --

Column 5,
Line 9, "FIG. 4, therefore," should read -- FIG. 4; therefore, --
Line 17, "that the different" should read -- that different --
Line 50, "second, however," should read -- second; however, --

Column 6,
Line 31, "presses, however," should read -- presses; however, --

Column 12,
Line 12, "within second" should read -- within a second --
Line 38, "claims 1, 2, 4, 6, 7, 9, 11, 13, 18, and 23." should read -- claims 1, 2, 4, 6, 7, 9-11, 13, 18, and 23 --

Signed and Sealed this

Fifth Day of October, 2004

JON W. DUDAS
*Director of the United States Patent and Trademark Office*